United States Patent
Fabris et al.

(10) Patent No.: US 8,997,433 B2
(45) Date of Patent: Apr. 7, 2015

(54) TRIM ASSEMBLY FOR A VEHICLE MAKING IT POSSIBLE TO CONCEAL A TECHNICAL SPACE

(71) Applicant: Faurecia Interieur Industrie, Nanterre (FR)

(72) Inventors: Stéphane Fabris, Mours (FR); Jacques Bergerioux, Arronville (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/887,022

(22) Filed: May 3, 2013

(65) Prior Publication Data

US 2013/0291478 A1  Nov. 7, 2013

(30) Foreign Application Priority Data

May 4, 2012 (FR) ...................................... 12 54135

(51) Int. Cl.
*B60R 13/02* (2006.01)
*B62D 1/187* (2006.01)

(52) U.S. Cl.
CPC .............. *B60R 13/02* (2013.01); *B62D 1/187* (2013.01); *B60R 13/0256* (2013.01); *B60R 13/0275* (2013.01)

(58) Field of Classification Search
CPC ............ B60R 21/2037; B60R 21/2035; B60R 21/21656; B60R 2011/001; B60Q 5/003; B62D 1/187; B62D 1/16; B62D 1/189
USPC ......... 52/716.5; 280/752, 775, 777; 296/1.08, 296/70
See application file for complete search history.

(56) References Cited

U.S. PATENT DOCUMENTS

| | | | |
|---|---|---|---|
| 6,183,011 B1* | 2/2001 | Andronis | 280/775 |
| 7,029,048 B1* | 4/2006 | Hicks et al. | 296/24.34 |
| 7,168,750 B2* | 1/2007 | Hutek et al. | 296/37.8 |
| 7,188,866 B2* | 3/2007 | Ridgway et al. | 280/777 |
| 7,300,072 B2* | 11/2007 | Ercolano et al. | 280/779 |
| 7,661,710 B2* | 2/2010 | Ikeda et al. | 280/775 |
| 8,316,736 B2* | 11/2012 | Buchheit | 74/492 |

(Continued)

FOREIGN PATENT DOCUMENTS

| | | |
|---|---|---|
| DE | 29624621 U1 | 8/2005 |
| EP | 0922623 A2 | 6/1999 |

(Continued)

OTHER PUBLICATIONS

French Search Report for application No. FR 1254135, Jan. 16, 2013, 2 pages.

*Primary Examiner* — Brian Glessner
*Assistant Examiner* — Adam Barlow
(74) *Attorney, Agent, or Firm* — Reising Ethington P.C.

(57) ABSTRACT

A trim assembly having a trim element and a first concealing element extending away from the trim element and being movable relative to the trim element. The trim assembly further includes at least one second rigid concealing element, extending from the trim element to the first concealing element and designed to conceal the space between the trim element and the first concealing element. The second concealing element is secured to the trim element and is biased against part of the first concealing element so as to bear against that part of the first concealing element in all positions of the first concealing element with respect to the trim element.

9 Claims, 3 Drawing Sheets

(56) References Cited

U.S. PATENT DOCUMENTS

2004/0245756 A1* 12/2004 Bostic et al. .................. 280/771
2007/0284867 A1* 12/2007 Cymbal et al. ................ 280/775
2007/0296195 A1* 12/2007 Manwaring et al. .......... 280/775
2012/0112438 A1* 5/2012 Soderquist et al. ........ 280/728.2

FOREIGN PATENT DOCUMENTS

| FR | 2960204 | 11/2011 |
| JP | 6157043 U | 4/1986 |
| JP | 2008068807 A | 3/2008 |

* cited by examiner

TRIM ASSEMBLY FOR A VEHICLE MAKING IT POSSIBLE TO CONCEAL A TECHNICAL SPACE

TECHNICAL FIELD

The present invention relates to a trim assembly for a vehicle and, more particularly, to a trim assembly for concealing the space extending between the periphery of the opening formed in a vehicle dashboard and the end of the steering column received in the dashboard opening.

BACKGROUND

It is known to provide a steering column whereof the position can be adjusted so as to improve the driving comfort in a motor vehicle by adapting the position of the steering wheel to the driver's preferences. Thus, the steering column is for example adjustable in terms of height and depth so as to position the steering wheel higher or lower and more or less forward in the passenger compartment. To enable this positioning, in particular heightwise, the opening in the dashboard has a diameter larger than that of the column so that the latter can be moved in that opening. There is therefore a space between the column and the edge of the opening, which allows the driver to see the elements situated under the dashboard behind the steering wheel. This space is unwanted, in particular for aesthetic reasons and to protect the cables and control members positioned under the steering wheel of the vehicle.

It is also known to provide a flexible elastic membrane, fixed on the one hand to the column and on the other hand to the dashboard. This membrane moves and deforms with the movement of the column so as to fill in the space between the latter and the dashboard in all positions of the column. However, such a membrane causes assembly difficulties, as it is necessary to assemble the membrane both to the column and to the dashboard, which slows assembly rhythms. Furthermore, this membrane is biased during the movement of the steering column, which causes premature wear thereof, as well as the formation of displeasing folds for passengers. Lastly, in case of impact, it may be torn out, and thereby exposing previously-concealed elements of the vehicle.

Document FR-2 960 204 proposes to offset this drawback by proposing a flexible protective sleeve fastened around the column and comprising a free end extending freely in a rigid concealing element and stationary relative to the dashboard.

However, although such an arrangement makes it possible to reduce the bulk of the concealing element, this reduction is not optimal inasmuch as the concealing element must comprise a housing for receiving the free end of the sleeve having sufficient dimensions for that end to remain in the housing in all positions of the steering column.

SUMMARY

One aim of the invention is to offset these drawbacks by proposing a trim assembly not comprising a flexible and fragile sleeve and making it possible to reduce the bulk of said assembly while effectively concealing the space between the technical element and the trim element, irrespective of the position of said technical element.

To that end, the invention relates to a trim assembly having at least one trim element and at least one first concealing element designed to conceal a technical element of the vehicle, the first concealing element extending away from the trim element and being movable relative to the trim element during the adjustment of the position of the technical element.

The trim assembly further includes at least one second rigid concealing element, extending from the trim element to the first concealing element and designed to conceal the space between the trim element and the first concealing element. The second concealing element is secured to the trim element and is biased against part of the first concealing element so as to bear against that part of the first concealing element in all positions of the first concealing element with respect to the trim element.

In order to conceal the space between the trim element and the technical element, the two concealing elements are biased against one another. Thus, the two concealing elements can be made from rigid materials, which eliminates the presence of a sleeve, and the bulk of the assembly is reduced, the concealing elements being able to be made up of "simple" continuous surfaces, without requiring the presence of a housing or fastening means between them. Such an assembly is capable of effectively concealing the space between the trim element and the technical element irrespective of the position of the technical element by biasing the second concealing element to bear against the first concealing element.

According to other features of the invention:
the second concealing element is secured to the trim element by means of a hinge enabling rotational movement of the second concealing element with respect to the trim element;
the second concealing element and the trim element are made in a single piece;
the hinge is made by thinning the material extending between the trim element and the second concealing element;
the trim assembly also comprises a biasing element arranged between the trim element and the second concealing element, the biasing element exerting a force against the second concealing element so as to cause it to bear against the part of the first concealing element in all positions of the first concealing element;
the outer surface of the free end part of the second concealing element bears against the inner surface of the free end part of the first concealing element when the second concealing element is stressed against the first concealing element;
the second concealing element comprises a stop element protruding from the outer surface of the free end part thereof and the first concealing element comprises a counter-stop element protruding from the inner surface of the free end part thereof, the stop element and the counter-stop element bearing against one another in an end position of the first concealing element with respect to the trim element;
the first concealing element has a substantially cylindrical shape, open at the two end parts and whereof the free end part is positioned opposite the trim element, the second concealing element extending from the trim element to the first concealing element while passing through the opening formed in the free end part;
the trim element forms an element for receiving dashboard instruments of the vehicle; and
the first concealing element forms an element for protecting a vehicle steering column.

BRIEF DESCRIPTION OF THE DRAWINGS

Other aspects and advantages of the invention will appear upon reading the following description, provided as an example and done in reference to the appended drawings, in which.

DETAILED DESCRIPTION OF THE ILLUSTRATED EMBODIMENT(S)

In the description, the term "outer" is defined by that which is turned toward the outside of the trim assembly extending on the visible side of the trim assembly, and "inner" by that which is turned toward the space to be concealed by the trim assembly and is not designed to be visible from the outside of the trim assembly.

The illustrated embodiment of the invention described below is in reference to a trim assembly 1 making it possible to conceal the space extending around the technical element formed by a steering column (not shown) of a motor vehicle whereof the position can be adjusted in a dashboard opening (not shown). It is, however, understood that the invention may also apply to other trim assemblies designed to conceal a space that may extend between a trim element and a technical element, different from the steering column, whereof the position can be adjusted with respect to the trim element. Thus, the invention may for example apply to concealing the space extending around a gear shifter, a handbrake, or another element.

Figure 1:
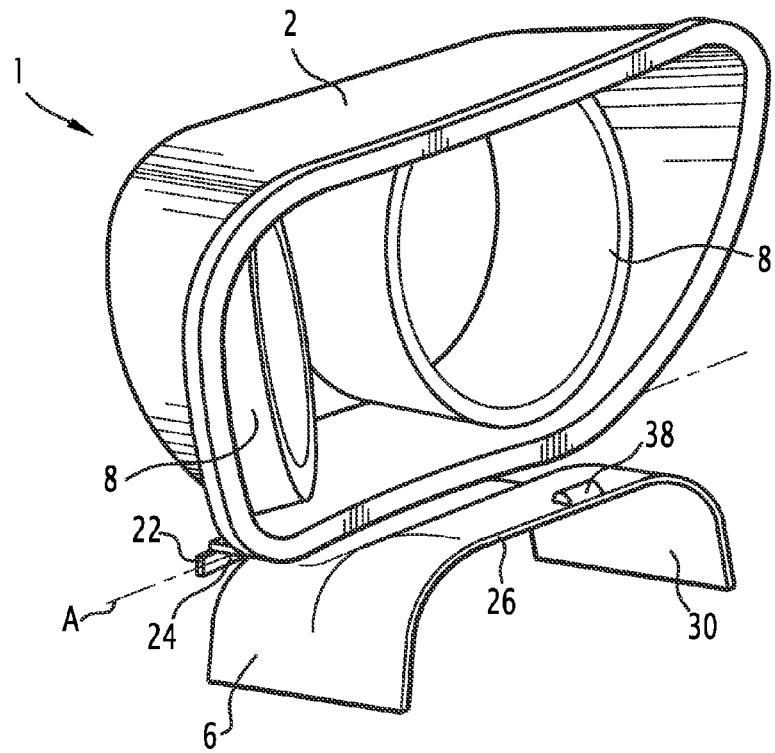
FIG. 1 is a diagrammatic perspective view of part of the trim assembly according to the invention.
Figure 2:
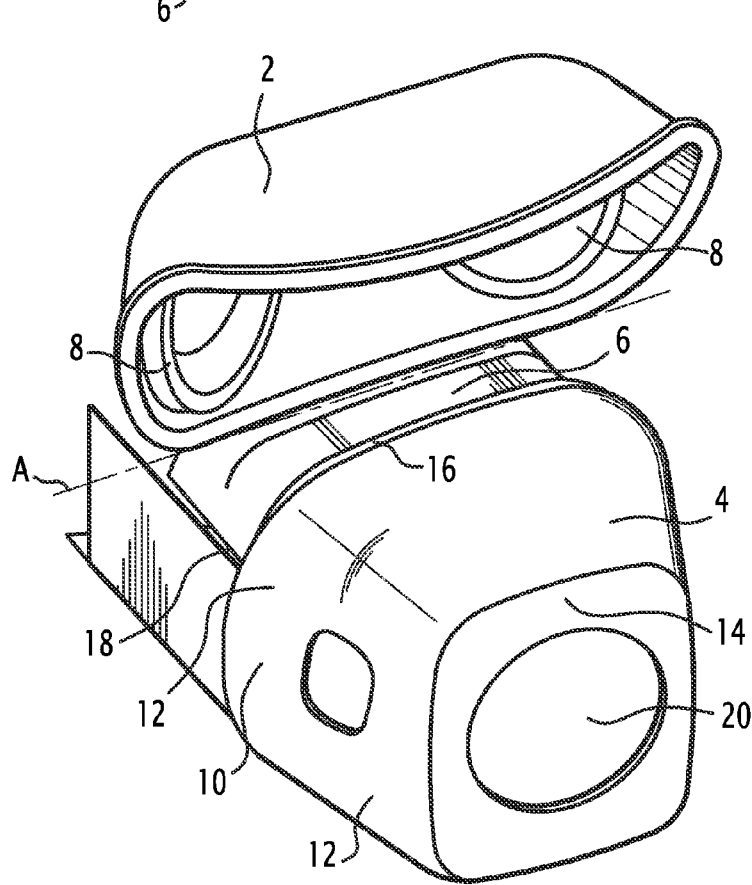
FIG. 2 is a diagrammatic perspective illustration of the trim assembly according to the invention.

In reference to FIGS. 1 and 2, a trim assembly 1 is described comprising a trim element 2, a first concealing element 4 and a second concealing element 6.

The trim element 2 for example forms an element for receiving at least one navigation instrument of the vehicle, such as a speedometer or other instrument. In such a case, as illustrated in FIGS. 1 and 2, the trim element 2 for example comprises fastening frames 8 for those instruments and has a shape adapted to the environment in which it must be integrated. The trim element 2 thus for example assumes the form of trim designed to impart a particular aesthetic to the vehicle dashboard. In the case of a dashboard, the trim element for example extends above the passage opening of the steering column in the vicinity of the edge of that opening. The shape of the trim element 2 is not, however, in any way limited to such trim and may be of any nature. As an example, the trim element 2 may also be formed by the surface of the dashboard or another surface.

Figure 4:
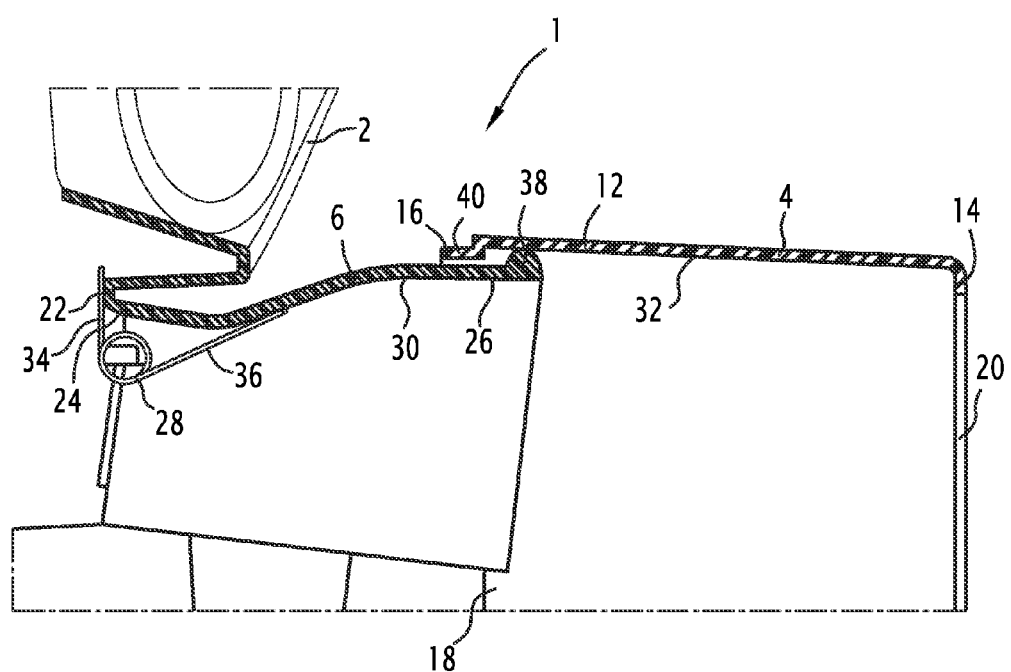
FIG. 4 is a diagrammatic cross-sectional illustration of part of the trim assembly of FIG. 2.

The first concealing element 4 is formed by a rigid shell 10 designed to be fitted on the end of the steering column, behind the steering wheel relative to the driver of the vehicle. The first concealing element 4 therefore forms an element protecting the steering column. Such a rigid shell 10 is for example made, in a known manner, from a plastic material by assembling two half-shells 12, one of which is shown in FIG. 4. The first concealing element 4 thus surrounds the end of the steering column and has a substantially cylindrical shape, which may or may not have a constant cross-section. In general, the first concealing element 4 forms a rigid sleeve open at each of its end parts 14 and 16. The steering column passes through the opening 18 of the end part 16, called free end part, and the first concealing element 4 is fastened to the column through the opening 20 of the end part 14, opposite the free end part 16, the edges of the opening 20 gripping the column. The skirt 12 extending between the end parts 14 and 16 surrounds the column while leaving a space around the latter so as to house technical elements therein, such as control electronics associated with the steering column. Thus, the first concealing element 4 makes it possible to conceal the steering column at the base of the steering wheel. The first concealing element 4 is movable with the steering column, i.e., its position varies with respect to the trim element 2 when the position of the steering column is adjusted by the user of the vehicle. In particular, the height position of the first concealing element 4 can be adjusted with respect to the trim element 2 as well as lengthwise, i.e., in the direction going from the trim element 2 to the first concealing element 4.

The second concealing element 6 extends from the trim element 2 to the first concealing element 4 so as to conceal, from the outside of the trim assembly 1, the space extending between those two elements 2 and 4, corresponding to the space extending between the shell 10 and the edge of the opening of the dashboard, in the case of a steering column passing through an opening of the vehicle dashboard. The second concealing element 6 has a shape corresponding substantially to the shape of the space to be concealed. Thus, according to the embodiment shown in the figures, the second concealing element 6 has a cross-section in the shape of an upside down U, substantially corresponding to the shape of a half-shell 12 of the first concealing element 4, that shape in turn substantially corresponding to the shape of the opening formed in the dashboard. In the direction going from the trim element 2 to the first concealing element 4, i.e., substantially in the front-to-back direction of a vehicle, the second concealing element 6 has a sufficient length to fill in the space extending between the trim element 2 and the first concealing element 4 when the first concealing element 4 is positioned in an extreme adjusting position, in which the first concealing element 4 is furthest from the trim element 2 in the direction going from the trim element 2 to the first concealing element 4.

The second concealing element 6 is rigid and is secured to an edge 22 of the trim element 2, by one of its end parts 24. The other end part 26 of the second concealing element 6, extending from the side of the first concealing element 4, is called free end part 26. The free end part 26 of the second concealing element 6 passes through the opening 18 formed in the free end part 16 of the first concealing element 4. Thus, the outer surface of the free end part 26 of the second concealing element 6 extends opposite the inner surface of the free end part 16 of the first concealing element, as shown in FIG. 4.

According to one embodiment, the second concealing element 6 is made in a single piece with the trim element 2 from a plastic material, for example by injection molding.

The second concealing element 6 is also movable with respect to the trim element 2 so as to allow it to adapt to the position of the first concealing element 4 with respect to the trim element 2. In particular, the second concealing element 6 is rotatable with respect to the trim element around an axis A formed by the edge 22 of the trim element 2 secured to the second concealing element 6. The axis A is substantially perpendicular to the direction going from the trim element 2 to the first concealing element 4 and substantially parallel to the base of the upside down U formed by the cross-section of the second concealing element 4. Thus, the free end part 26 of the second concealing element 6 can have an angular travel with respect to the end part 24 secured to the trim element 2, which makes the height of the second concealing element 6 adjustable with respect to the trim element 2.

The axis A is formed by a hinge, for example formed by a thinning of the material forming the edge 22 extending between the trim element 2 and the second concealing element 6 when those elements are made in a single piece. Such a fitting of the material makes it possible to form a film hinge along the axis A between the trim element 2 and the second concealing element 6.

Figure 3:
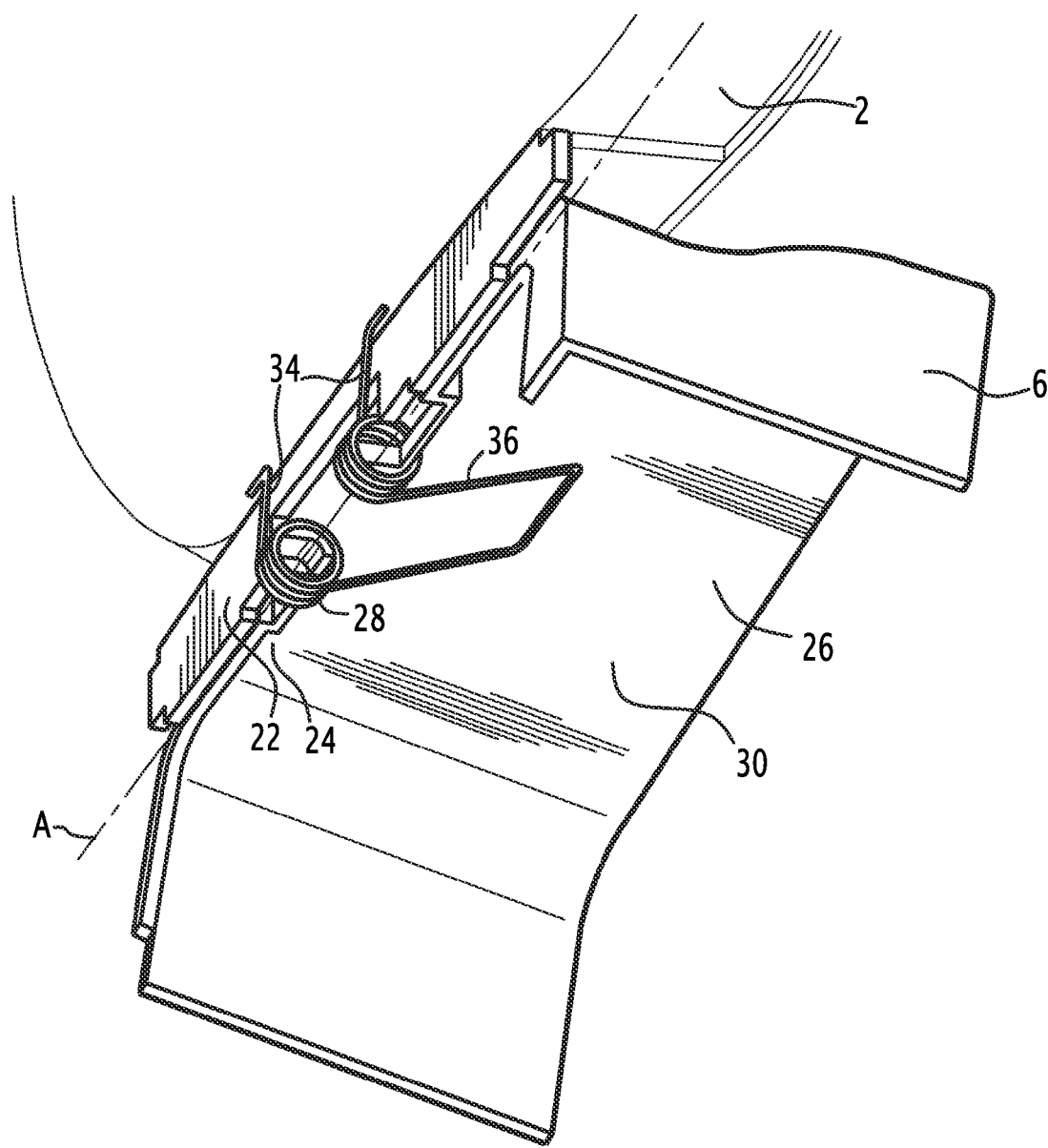
FIG. 3 is a diagrammatic perspective illustration of the part of the trim assembly of FIG. 1 from another viewpoint.

The second concealing element 6 is also biased by a biasing element 28 arranged to exert a bearing force on the inner surface 30, turned toward the space to be concealed, of the second concealing element 6 so as to push the second concealing element 6 upward while tending to bring the free end part 26 of the second concealing element 6 closer to the trim element 2, as shown in FIGS. 3 and 4. Thus, the second concealing element 6, and in particular the free end part 26 thereof, is pressed against the inner surface 32 of the first concealing element 4, in particular against the free end part 16 thereof, as shown in FIG. 4. More particularly, the outer surface of the free end part 26 of the second concealing element 6 is pressed against the inner surface of the free end part 16 of the first concealing element 4, such that, from the outside of the trim assembly 1, no space is seen between the outer surface of the first concealing element 4 and the outer surface of the second concealing element 6, as shown in FIGS. 2 and 4. The biasing element 28 is for example formed by a spring comprising at least one bearing tab 34 against the edge 22 of the trim element 22 and a stressing tab 36 against the inner surface 30 of the second concealing element 6, arranged to push against that surface 30, as shown in FIG. 3.

Biasing the second concealing element 6 against the first concealing element 4 makes it possible to ensure that the space to be concealed will be concealed in all positions of the first concealing element 4 without requiring additional adjustment of the position of the second concealing element 6. When the first concealing element 4 is moved upward, for example when the driver of the vehicle raises the steering column, the stressing element 28 pushes the second concealing element 6 upward such that it remains in contact with the first concealing element. Conversely, when the first concealing element 4 is lowered, for example when the driver lowers the steering column, the first concealing element bears on the second concealing element 6 against the force of the biasing element 28, such that the second concealing element 6 descends with the first concealing element 4 while remaining in contact therewith.

During the adjustment of the length of the position of the first concealing element 4, the length of the second concealing element 6 is such that the outer surface of the free end part 26 of the second concealing element 6 remains opposite the inner surface of the free end part 16 of the first concealing element 4, irrespective of the position of that first concealing element 4 with respect to the trim element 2 in the adjustment range of the position of the first concealing element 4.

The outer surface of the free end part 26 of the second concealing element 6 further comprises a stop element 38 protruding from the outer surface toward the inner surface of the free end part 16 of the first concealing element 4. The inner surface of the free end part 16 of the first concealing element 4 comprises a counter-stop 40 protruding from the inner surface toward the outer surface of the free end part 26 of the second concealing element 6. The stop element 38 and the counter-stop element 40 bear against each other in an extreme position of the first concealing element 4 with respect to the trim element 2 and prevent the second concealing element 6 from leaving the opening 18 formed in the free end part 16 of the first concealing element 4.

The trim assembly 1 described above makes it possible to guarantee that the space extending between the first concealing element 4 and the trim element 2 is constantly concealed by the second concealing element 6, irrespective of the position of the first concealing element 4 with respect to the trim element 2 in the adjustment range thereof, which makes it possible to ensure satisfactory aesthetics for the trim assembly and protect the elements extending under the assembly, such as connection cables or control members for the operation of the vehicle. This concealing is also ensured without making it necessary to adjust the position of the second concealing element 6 with respect to the first concealing element 4. The trim assembly 1 does not have any fragile flexible elements, such as a protective sleeve or membrane, and only comprises rigid concealing elements guaranteeing the robustness of the trim assembly 1. This assembly 1 is also in particular not bulky, in particular on the inner side of the second concealing element 6, since that element does not bear any housings. Thus, the trim assembly 1 leaves space available for positioning technical elements, which is particularly important in the context of a dashboard comprising a large number of instruments.

Lastly, the trim assembly comprises a small number of elements, in particular when the second concealing element 6 is made in a single piece with the trim element 2. This trim element 2/second concealing element 6 assembly can be produced in a single plastic injection step by producing the film hinge at the same time. This assembly may be stripped simply by providing for molding the assembly in a position in which the surface of the second concealing element 6 extends in the continuation of the edge 22 of the trim element 2. It is then sufficient to fold the second concealing element 6 toward the trim element 2 around the hinge and to mount the biasing element 28. The mounting of the trim assembly 1 is therefore simple and requires few operations.

The invention claimed is:

1. A trim assembly for a vehicle comprising at least one trim element and at least one first concealing element designed to conceal a technical element of the vehicle, said first concealing element extending away from said trim element and being movable relative to the trim element during the adjustment of the position of the technical element, said trim assembly further comprising at least one second rigid concealing element, extending from the trim element to the first concealing element and designed to conceal the space between the trim element and the first concealing element, wherein the second concealing element is secured to the trim element and wherein the trim assembly further comprises a biasing element, said biasing element exerting a force against said second concealing element so as to bias it against part of the first concealing element and to cause it to bear against said part of the first concealing element in all positions of the first concealing element with respect to the trim element, an outer surface of a free end part of the second concealing element bearing against an inner surface of a free end part of the first concealing element when the second concealing element is pressed against the first concealing element by the biasing element.

2. The trim assembly according to claim 1, characterized in that the second concealing element is secured to the trim element by means of a hinge enabling rotational movement of the second concealing element with respect to the trim element.

3. The trim assembly according to claim 1, characterized in that the second concealing element and the trim element are made in a single piece.

4. The trim assembly according to claim 2, characterized in that the hinge is made by thinning the material extending between the trim element and the second concealing element.

5. The trim assembly according to claim 1, characterized in that the biasing element is arranged between the trim element and the second concealing element.

6. The trim assembly according to claim 1, characterized in that the second concealing element comprises a stop element protruding from the outer surface of the free end part thereof and the first concealing element comprises a counter-stop element protruding from the inner surface of the free end part thereof, the stop element and the counter-stop element bearing against one another in an end position of the first concealing element with respect to the trim element.

7. The trim assembly according to claim 1, characterized in that the first concealing element has a substantially cylindrical shape, open at said two end parts and whereof the free end part is positioned across from the trim element, the second concealing element extending from the trim element to the first concealing element while passing through the opening formed in said free end part.

8. The trim assembly according to claim 1, characterized in that the trim element forms an element for receiving dashboard instruments of the vehicle.

9. The trim assembly according to claim 1, characterized in that the first concealing element forms an element for protecting a vehicle steering column.

* * * * *